(12) United States Patent
Ishimura et al.

(10) Patent No.: US 8,200,900 B2
(45) Date of Patent: Jun. 12, 2012

(54) METHOD AND APPARATUS FOR CONTROLLING CACHE MEMORY

(75) Inventors: Naoya Ishimura, Kawasaki (JP); Hiroyuki Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 12/320,941

(22) Filed: Feb. 9, 2009

(65) Prior Publication Data
US 2009/0300287 A1 Dec. 3, 2009

(30) Foreign Application Priority Data

May 28, 2008 (JP) .................... 2008-139986

(51) Int. Cl.
*G06F 12/00* (2006.01)
(52) U.S. Cl. ....................................... 711/119
(58) Field of Classification Search .................. None
See application file for complete search history.

(56) References Cited

U.S. PATENT DOCUMENTS

| | | | |
|---|---|---|---|
| 4,851,993 A | 7/1989 | Chen et al. | |
| 4,998,221 A | 3/1991 | Correale, Jr. | |
| 5,454,093 A | 9/1995 | Abdulhafiz et al. | |
| 2008/0098174 A1 | 4/2008 | Chiba et al. | |
| 2008/0140934 A1 | 6/2008 | Luick | |

FOREIGN PATENT DOCUMENTS

| | | |
|---|---|---|
| CN | 1227932 | 9/1999 |
| CN | 1608249 | 4/2005 |
| EP | 1 220 090 | 7/2002 |
| JP | 8-202620 | 8/1996 |
| JP | HEI08-202620 A | 8/1996 |
| JP | 10-111798 | 4/1998 |
| JP | HEI10-111798 A | 4/1998 |
| WO | 03/036482 | 5/2003 |

OTHER PUBLICATIONS

Chinese Office Action for corresponding Chinese Application No. 200910118464.1, issued on Dec. 27, 2010.
Extended European Search Report issued on Sep. 28, 2009 in corresponding European Application No. 09152023.9.

*Primary Examiner* — Brian Peugh
(74) *Attorney, Agent, or Firm* — Staas & Halsey LLP (57) ABSTRACT

An apparatus for controlling a cache memory that stores therein data transferred from a main storing unit includes a computing processing unit that executes a computing process using data, a connecting unit that connects an input portion and an output portion of the cache memory, a control unit that causes data in the main storing unit to be transferred to the output portion of the cache memory through the connecting unit when the data in the main storing unit is input from the input portion of the cache memory into the cache memory, and a transferring unit that transfers data transferred by the control unit to the output portion of the cache memory, to the computing processing unit.

8 Claims, 5 Drawing Sheets

METHOD AND APPARATUS FOR CONTROLLING CACHE MEMORY

CROSS-REFERENCE TO RELATED APPLICATION(S)

This application is based upon and claims the benefit of priority of the prior Japanese Patent Application No. 2008-139986, filed on May 28, 2008, the entire contents of which are incorporated herein by reference.

FIELD

The embodiment discussed herein is directed to a cache memory control apparatus, a semiconductor integrated circuit, and a cache memory control method.

BACKGROUND

An information processing apparatus including a processor core such as a CPU (Central Processing Unit) is usually provided with a cache memory to realize higher-speed processing. A cache memory is a memory that is accessible at a higher speed than a main storing unit such as a main memory, and the cache memory stores only data that the CPU frequently uses of the data stored in the main storing unit. Therefore, when the CPU executes various computing processes, the CPU first accesses the cache memory and requests the cache memory for the necessary data. In this case, when the necessary data is not stored in the cache memory, a cache miss occurs and the necessary data is transferred from the main storing unit to the cache memory. That is, when a READ is executed to the cache memory and the cache miss occurs as a result, the data is transferred from the main storing unit to the cache memory by a MOVE-IN.

As above, when a cache miss occurs, the necessary data is stored in the cache memory by the MOVE-IN and, therefore, the CPU again executes a READ and, thereby, reads the data from the cache memory. Therefore, the two READs and the one MOVE-IN are executed by the time the CPU obtains the data, and the delay time (hereinafter, "latency") is extended. To improve the performance of the information processing apparatus by reducing the delay incurred in data acquisition, it is possible to transfer the data from the main storing unit to the cache memory and to simultaneously transfer the data also to the CPU (see, e.g., Japanese Laid-open Patent Publication No. 10-111798).

Figure 7:
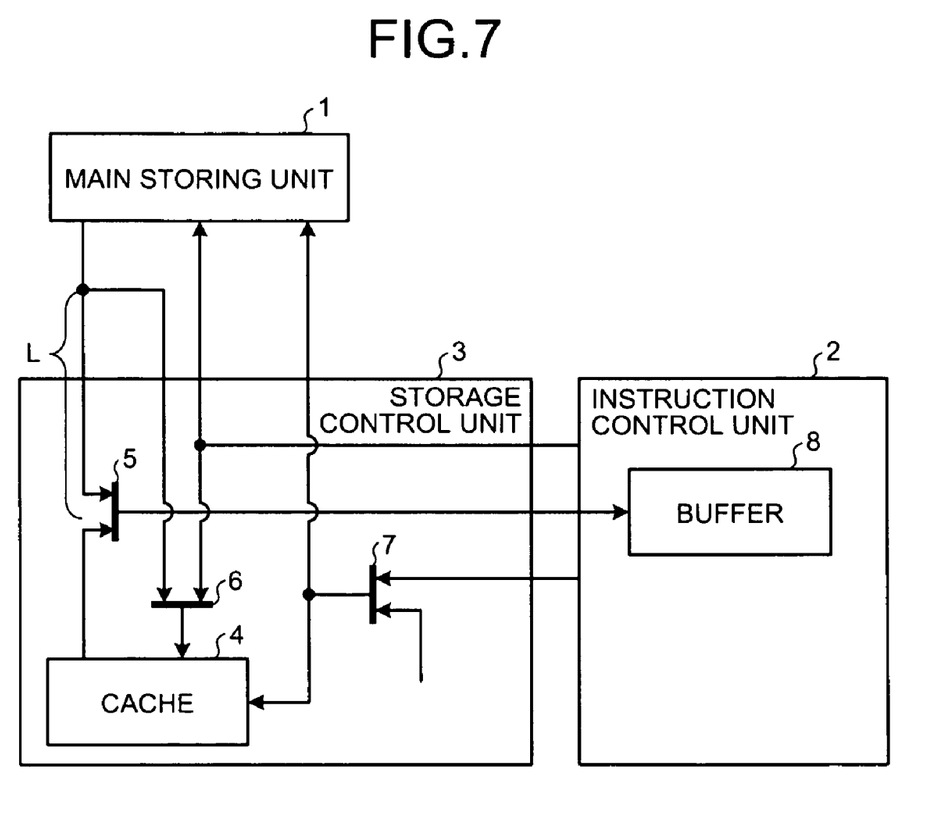
FIG. 7 is a diagram of an example of the configuration of an information processing apparatus.
Figure 8:
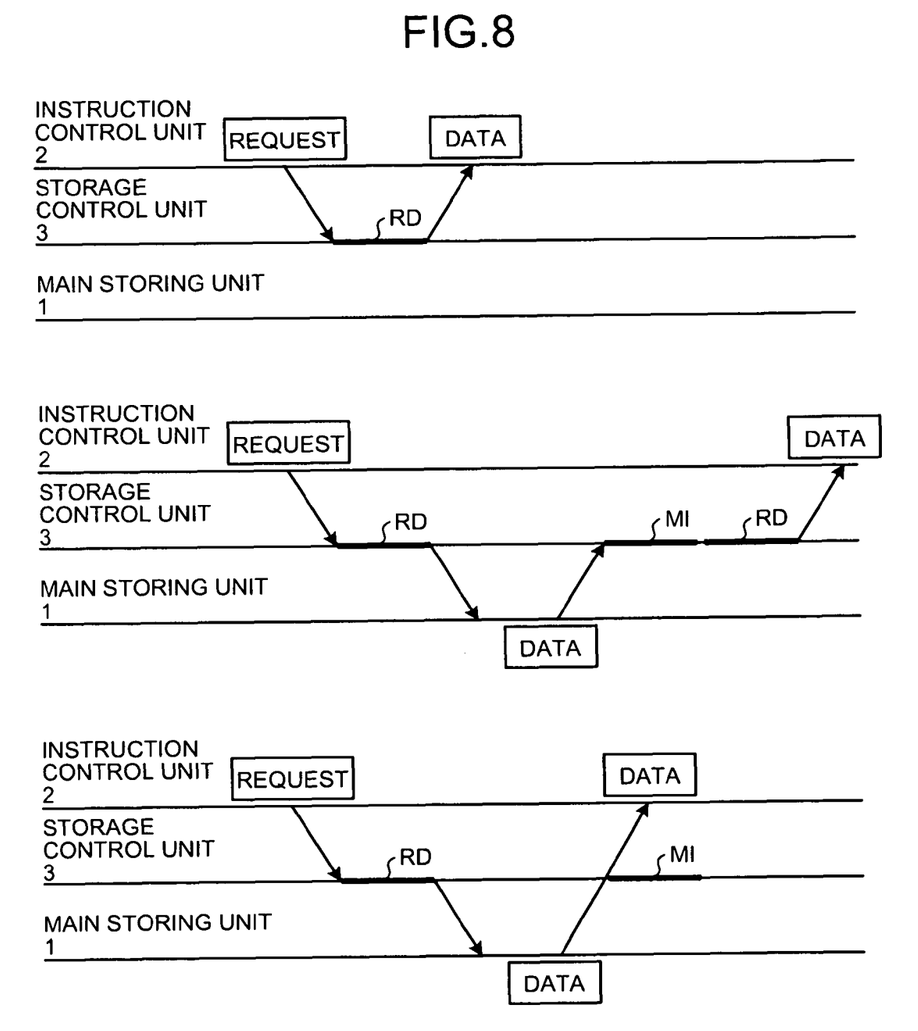
FIG. 8 is an explanatory chart of latency in an information processing apparatus.

FIG. 7 is a diagram of the configuration of an information processing apparatus described in Japanese Laid-open Patent Publication No. 10-111798. The information processing apparatus depicted in FIG. 7 includes a main storing unit 1, an instruction control unit 2, and a storage control unit 3. When the instruction control unit 2 requests data, the storage control unit 3 executes a READ for the data. That is, a data request from the instruction control unit 2 is transferred to a cache 4 through a selector 7 in the storage control unit 3. When the requested data is stored in the cache 4 (cache hit), the data is read to a buffer 8 in the instruction control unit 2 through a selector 5. In this case, as illustrated in the upper portion of FIG. 8, the instruction control unit 2 is able to obtain the data from the storage control unit 3 and only one READ (In FIG. 8, "RD") is executed by the time the data is obtained. Therefore, there is almost no latency in data acquisition by the instruction control unit 2.

On the other hand, when the requested data is not stored in the cache 4 (cache miss), a MOVE-IN that causes the data stored in the main storing unit 1 to be transferred to the cache 4 is executed. That is, the data request from the instruction control unit 2 is transferred to the main storing unit 1 through the selector 7 and the requested data is transferred to the cache 4 through a selector 6. In the normal case, thereafter: the instruction control unit 2 again requests the data; the storage control unit 3 executes a READ; and the requested data is read from the cache 4 to the buffer 8 through the selector 5. In this case, as illustrated in the middle portion of FIG. 8, the two READs (RD) and the one MOVE-IN (in FIG. 8, "MI") are executed by the time the instruction control unit 2 obtains the data. Therefore, the latency in data acquisition by the instruction control unit 2 becomes long.

However, in Japanese Laid-open Patent Publication No. 10-111798, a line L is provided that directly connects the main storing unit 1 and the buffer 8 of the instruction control unit 2 through the selector 5 and, therefore, the data is transferred from the main storing unit 1 to the cache 4 through the selector 6 and simultaneously the data is read to the buffer 8 through the line L. Therefore, as illustrated in the lower portion of FIG. 8, the instruction control unit 2 is able to obtain the data simultaneously with the MOVE-IN (MI) to the cache 4. Therefore, the latency can be reduced.

Recently, for a single-core semiconductor integrated circuit including one processor core (hereinafter, "core"), problems such as increase of power consumption are not ignorable and performance improvement is approaching its limit. Further performance improvement of a semiconductor integrated circuit may be realized by a multi-core configuration that includes a plurality of cores on one substrate. When the cache memory and the main storing unit are divided into a plurality of banks in the semiconductor integrated circuit having the multi-core configuration, throughput may be improved among each of the cores, the cache memory, and the main storing unit.

In a semiconductor integrated circuit employing the multi-core configuration divided into the banks: a plurality of cores, a plurality of cache memories, and a plurality of main storage control units each connected to a main storing unit are disposed on the outer edge of a substrate; and a control unit that controls the entire data transfer is disposed in the center of the substrate. Each divided bank of the main storing unit stores data having an address different from each other and, therefore, each core may request data to all the main storage control units on the substrate. Therefore, as in the above Japanese Laid-open Patent Publication No. 10-111798, in order to directly connect the main storing unit and the cores, all the cores and all the main storage control units need to be mutually connected and a problem is arisen that the wiring on the substrate becomes complicated.

That is, a core disposed on the opposite side of each main storage control unit sandwiching the control unit disposed in the center of the substrate may request data to the main storage control unit. Therefore, to reduce the latency in data acquisition by the core, a main storage control unit and a core that are disposed away from each other on the substrate also need to be directly connected. As a result, the wiring on the substrate needs to be significantly changed and expanded and this results in a larger size of the semiconductor integrated circuit. Recently, an apparatus loaded with a semiconductor integrated circuit is increasingly downsized and, therefore, the increase in the size of the semiconductor integrated circuit is not practical as means for reducing the latency in data acquisition by the cores.

SUMMARY

According to one aspect of the invention, an apparatus for controlling a cache memory that stores therein data transferred from a main storing unit includes a computing processing unit that executes a computing process using data, a connecting unit that connects an input portion and an output portion of the cache memory, a control unit that causes data in the main storing unit to be transferred to the output portion of the cache memory through the connecting unit when the data in the main storing unit is input from the input portion of the cache memory into the cache memory, and a transferring unit that transfers data transferred by the control unit to the output portion of the cache memory, to the computing processing unit.

According to another aspect of an embodiment, a semiconductor integrated circuit includes a processor core that executes a computing process using data, a cache memory that has stored therein data stored in a main memory, a connecting line that connects an input portion and an output portion of the cache memory, a control unit that causes data in the main memory to be transferred to the output portion of the cache memory through the connecting line when the data in the main memory is input to the cache memory, and a data bus that transfers data transferred by the control unit to the output portion of the cache memory, to the processor core.

According to another aspect of an embodiment, a method for controlling a cache memory that stores therein data transferred from a main storing unit in a cache memory control apparatus which includes a computing processing unit that executes computing processing using data. The method includes writing data in the main storing unit to the cache memory by inputting the data from an input portion of the cache memory, firstly transferring the data written into the cache memory in the writing, from the input portion of the cache memory to an output portion of the cache memory, and secondly transferring the data transferred in the firstly transferring, from the output portion of the cache memory to the computing processing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will be described in detail referring to the accompanying drawings. A semiconductor integrated circuit that includes a plurality of cores, a plurality of cache memories, and a plurality of main storage control units disposed on one substrate will be described. However, the present invention is also applicable to a semiconductor integrated circuit that includes only one core, only one cache memory, and only one main storage control unit on one substrate.

Figure 1:
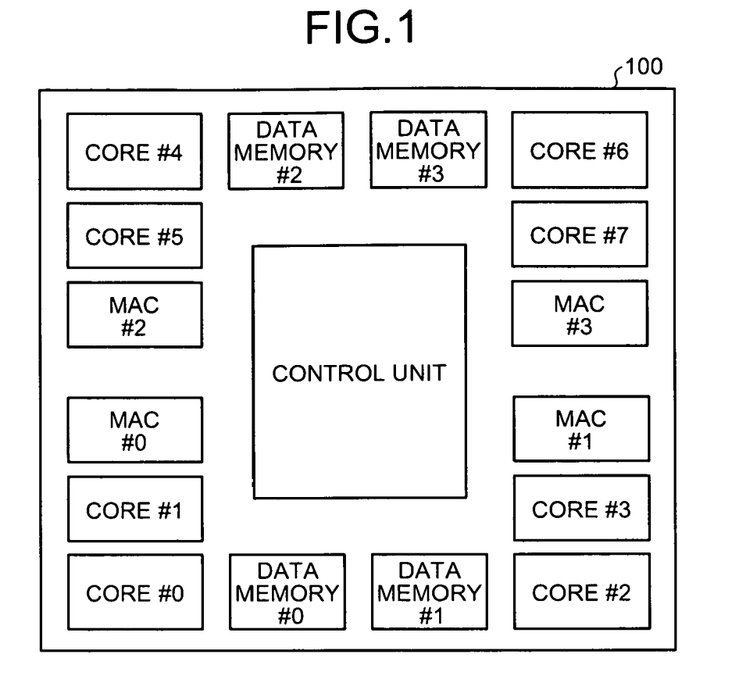
FIG. 1 is a schematic diagram of a configuration of a semiconductor integrated circuit according to an embodiment of the invention.

FIG. 1 is a schematic diagram of a configuration of a semiconductor integrated circuit 100 according to the embodiment. The semiconductor integrated circuit 100 depicted in FIG. 1 includes eight cores #0 to #7. In the semiconductor integrated circuit 100, corresponding to the main storing unit divided into four banks that is not depicted in FIG. 1, the cache memory and the main storage control unit are respectively divided into four data memories #0 to #3 and four MACs (Memory Access Controllers) #0 to #3. The cores #0 to #7, the data memories #0 to #3, and the MACs #0 to #3 are disposed on the outer edge of a substrate. A control unit is disposed in the center of the substrate. The semiconductor integrated circuit 100 depicted in FIG. 1 includes a cache memory control apparatus that controls data transfer from each of the MACs #0 to #3 to each of the data memories #0 to #3, and data transfer from each of the data memories #0 to #3 to each of the cores #0 to #7.

The cores #0 to #7 obtain data that is temporarily retained in the data memories #0 to #3 by the execution of a READ by the control unit, and the cores execute various computing processes. When the necessary data is not retained in the data memories #0 to #3 (cache miss), the cores #0 to #7 request for the data to one of the MACs #0 to #3 that corresponds to the bank of the main storing unit having the data stored therein. The cores #0 to #7 obtain data same as the data input into the data memories #0 to #3 by the execution of a MOVE-IN by the control unit when the data is transferred from the MACs #0 to #3 to the data memories #0 to #3. That is, the cores #0 to #7 obtain data same as the data to be written into the data memories #0 to #3, from an input portion to the data memories #0 to #3.

Each of the data memories #0 to #3 constitutes a part of the cache memory and temporarily retains the data that the cores #0 to #7 use. More specifically, when the control unit executes a READ, the data memories #0 to #3 output the data that the cores #0 to #7 request for. When the control unit executes a MOVE-IN, the data memories #0 to #3 obtain the data that the cores #0 to #7 request for from the MACs #0 to #3 and the data memories #0 to #3 store therein the obtained data.

The MACs #0 to #3 respectively correspond to four banks of the main storing unit, not depicted in FIG. 1, that have stored therein data having addresses different from each other. When a cache miss occurs, the MACs #0 to #3 obtain the data that the cores #0 to #7 request for, from the main storing unit, and the cores #0 to #7 transfer the obtained data to the data memories #0 to #3.

The control unit executes READs and MOVE-INs by a pipeline process. That is, when the cores #0 to #7 request for data, the control unit inputs a READ request into a pipeline, the control unit searches in a tag memory not depicted in FIG. 1, and the control unit judges whether the requested data is stored in the data memories #0 to #3. When the requested data is stored in the data memories #0 to #3 (cache hit), the control unit causes the data to be output from the data memories #0 to #3 to the cores #0 to #7. On the other hand, when the requested data is not stored in the data memories #0 to #3 (cache miss), the control unit inputs a MOVE-IN request into the pipeline and causes the data to be transferred from the MACs #0 to #3 to the data memories #0 to #3.

In addition to the READ and the MOVE-IN, the control unit executes: a WRITE-BACK that causes the data that is subjected to computing process by the cores #0 to #7, to be written back into the data memories #0 to #3; a MOVE-OUT that causes data to be discharged from the data memories #0 to #3 to the main storing unit; etc. When the control unit inputs an instruction such as a READ request and a MOVE-IN request into the pipeline, the control unit inputs the instructions into the pipeline taking proper intervals among them such that no interference is caused by simultaneous use of resources such as the data memories #0 to #3, etc. by a plurality of instructions.

Figure 2:
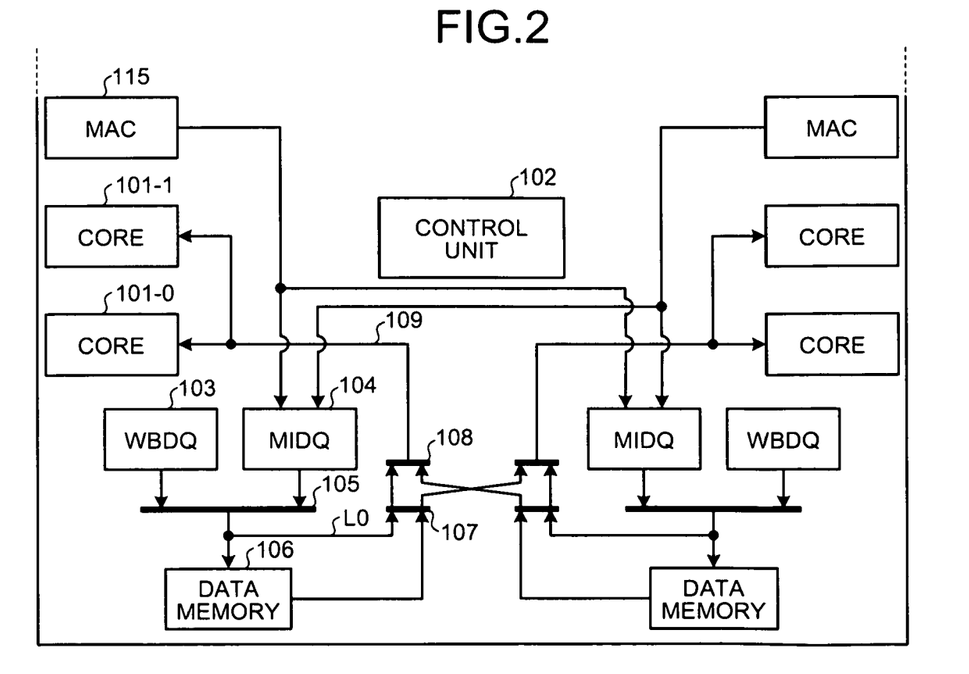
FIG. 2 is a diagram of a configuration of a main portion of the semiconductor integrated circuit according to the embodiment.

FIG. 2 is a diagram of a configuration of a main portion of the semiconductor integrated circuit 100 according to the embodiment. In FIG. 2, portions corresponding to the cores #0 to #3, the data memories #0 and #1, and the MACs #0 and #1 of the semiconductor integrated circuit 100 depicted in FIG. 1 are particularly enlarged. The semiconductor integrated circuit 100 depicted in FIG. 2 includes cores 101-0 and 101-1, a control unit 102, a write back data queue (hereinafter, "WBDQ") 103, a MOVE-IN data queue (hereinafter, "MIDQ") 104, a selector 105, a data memory 106, selectors 107 and 108, a data bus 109, and an MAC 115. The semiconductor integrated circuit 100 depicted in FIG. 2 is configured to have left-right symmetry and, therefore, reference numerals are given in only the left-side half. In FIG. 2, movements of data mainly around the data memory 106 are indicated by arrows.

The cores 101-0 and 101-1 execute various computing processes using data stored in the data memory 106 and the main storing unit not depicted in FIG. 2. The cores 101-0 and 101-1 request for data necessary for a computing process to the control unit 102. When the data is stored in the data memory 106 (cache hit), the cores 101-0 and 101-1 obtain the data that is read from the data memory 106 by the execution of a READ. When the data is not stored in the data memory 106 (cache miss), the cores 101-0 and 101-1 obtain the data that is transferred from the main storing unit to the data memory 106 through the MAC 115 by execution of a MOVE-IN. More specifically, the cores 101-0 and 101-1 obtain the data transferred to the MIDQ 104 provided on an input portion of the data memory 106 by the execution of the MOVE-IN after writing of the data into the data memory 106 is completed.

The control unit 102 executes a READ or a MOVE-IN that the cores 101-0 and 101-1 request by the pipeline process. That is, when the cores 101-0 and 101-1 request for the data, the control unit 102 inputs the READ request into the pipeline. In the case of a cache hit, the control unit 102 causes the data to be transferred from the data memory 106 to the cores 101-0 and 101-1. In the case of a cache miss, the control unit 102 causes the data to be transferred from the MAC 115 that corresponds to the main storing unit having the requested data stored therein to the MIDQ 104 and, thereafter, the control unit 102 inputs the MOVE-IN request into the pipeline and causes the requested data to be transferred from the MIDQ 104 to the data memory 106.

The WBDQ 103 is a queue that temporarily retains the data that is written back from the cores 101-0 and 101-1 to the data memory 106 when a WRITE-BACK is executed. That is, the WBDQ 103 temporarily retains the data processed by the cores 101-0 and 101-1 and outputs the data to the data memory 106 through the selector 105.

The MIDQ 104 is provided on the input portion of the data memory 106 and, the MIDQ 104 is a queue that temporarily retains the data that is transferred from the MAC 115 to the data memory 106 when a MOVE-IN is executed in the case where a cache miss occurs. That is, the MIDQ 104 temporarily retains the data that the cores 101-0 and 101-1 request for and transferred from the MAC 115, and the MIDQ 104 outputs the data to the data memory 106 through the selector 105. After the data is written into the data memory 106, the MIDQ 104 also outputs the same data to the selector 107.

The selector 105 selects either one of pieces of data retained in the WBDQ 103 and the MIDQ 104, and the selector 105 outputs the selected data to the data memory 106. More specifically, the selector 105 selects the data retained in the WBDQ 103 when a WRITE-BACK is executed by the pipeline of the control unit 102. The selector 105 selects the data retained in the MIDQ 104 when a MOVE-IN is executed by the pipeline of the control unit 102.

When a MOVE-IN is executed, after the data retained in the MIDQ 104 is written into the data memory 106, the selector 105 also outputs the same data to the selector 107 through a line L0. That is, the selector 105 outputs to the line L0 the same data as the data that is written into the data memory 106 by the execution of the MOVE-IN and the selector 105 causes the output data to be transferred from the selector 107 to the cores 101-0 and 101-1.

The line L0 is the wiring that connects a point between the MIDQ 104 and the data memory 106, and the selector 107, and thus the line L0 connects the input portion and an output portion of the data memory 106. Therefore, the line L0 is a very short line provided only around the data memory 106 and, when the line L0 is newly provided, almost no influence is given by the line L0 on the wiring around it. The line L0 transfers the same data as the data to be input into the data memory 106, to the output portion of the data memory 106 through which the data output from the data memory 106 passes when a READ is executed.

The data memory 106 is a memory that constitutes a portion of the cache memory, and the data memory 106 temporarily has stored therein the data frequently used by the cores 101-0 and 101-1. In the embodiment, the cache memory includes a data memory and a tag memory divided into a bank and, for example, RAMs (Random Access Memories) may be used as these memories.

The selector 107 is provided on the output portion of the data memory 106. The selector 107 selects either one of the data output from the MIDQ 104 and the data output from the data memory 106, and outputs the selected data to the selector 108 or to cores other than the cores 101-0 and 101-1. More specifically, when the MOVE-IN is executed by the pipeline of the control unit 102, the selector 107 selects the data output from the MIDQ 104. When the READ is executed by the pipeline of the control unit 102, the selector 107 selects the data output from the data memory 106.

In other words, the selector 107 selects either one of the data that is "READ" when a cache hit occurs and the data that is "MOVED-IN" when a cache miss occurs, as the data to be transferred to the cores 101-0 and 101-1. In the case where the cache miss occurs, when the data is written into the data memory 106 by the execution of the MOVE-IN, the selector 107 obtains the same data from the line L0 and transfers this same data to the cores 101-0 and 101-1. In this manner, the selector 107 transfers to the cores 101-0 and 101-1 the same data as the data to be input into the data memory 106 when the MOVE-IN is executed, handling this data equally to the data to be output from the data memory 106 when the READ is executed. Thereby, even when the data that is input into the data memory 106 by the execution of the MOVE-IN is not again output from the data memory 106 by the execution of a READ, the requested data can be quickly transferred to the cores 101-0 and 101-1.

Whether a READ is executed or a MOVE-IN is executed, the selector 107 outputs the data in the same cycle of the pipeline process. That is, for the MOVE-IN, after a data-write access to the data memory 106, the same data as the data written into the data memory 106 is output from the MIDQ 104 to the selector 107. For the READ, after a data-read access to the data memory 106, the data read from the data memory 106 is output from the data memory 106 to the selector 107. Therefore, whether for the MOVE-IN or for the READ, the cycle of the pipeline process for the data to arrive at the selector 107 becomes same and the data transfer from the selector 107 to the cores 101-0 and 101-1 becomes completely the same process.

The selector 108 selects either one of the data output from the selector 107 and the data output from a data memory other than the data memory 106, and the selector 108 outputs the selected data to the cores 101-0 and 101-1. More specifically, when the cores 101-0 and 101-1 request for the data stored in the data memory 106, the selector 108 selects the data output from the selector 107. When the cores 101-0 and 101-1 request the data stored in a data memory other than the data memory 106, the selector 108 selects the data output from the data memory that is the data request destination.

The data bus 109 connects the selector 108 and the cores 101-0 and 101-1, and the data bus 109 transfers the data that is output from the data memory 106 or the MIDQ 104 and that passes through the selectors 107 and 108, to the cores 101-0 and 101-1. That is, the data bus 109 is commonly used for both of the READ and the MOVE-IN that are executed by the pipeline of the control unit 102 and, therefore, the data bus 109 is occupied during predetermined cycles while each of these instructions is being executed.

The MAC 115 is connected to the main storing unit which is not depicted in FIG. 2 and has stored therein all pieces of data that the cores 101-0 and 101-1 may use. When a cache miss occurs, the MAC 115 obtains from the main storing unit the data for which the cache miss occurs, and transfers the obtained data to the MIDQ 104. The data transferred to the MIDQ 104 is transferred from the MIDQ 104 to the data memory 106 by the execution of the MOVE-IN.

Figure 3:
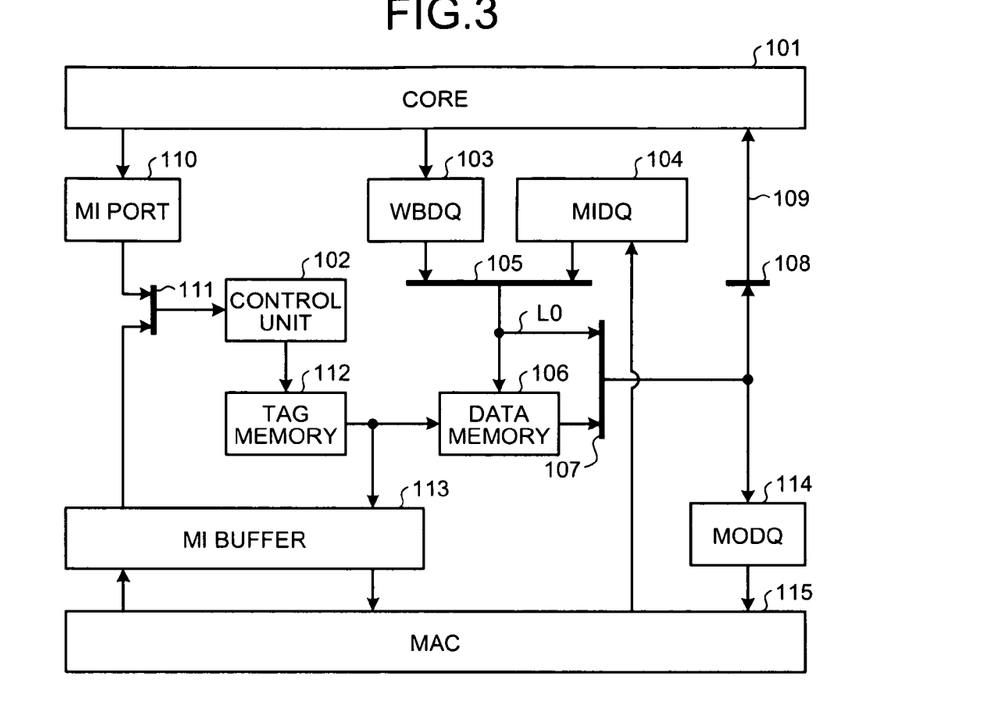
FIG. 3 is a diagram of a connection relation in a cache memory control apparatus according to the embodiment.

The connection relation of the core, the cache memory, and the MAC according to the embodiment will be described in more detail referring to FIG. 3. FIG. 3 is a schematic diagram of a connection relation of a core 101, the cache memory including the data memory 106 and a tag memory 112, and the MAC 115. In FIG. 3, the same reference numerals are given to the components same as those in FIG. 2. In FIG. 3, in addition to the components depicted in FIG. 2, a move-in port (hereinafter, "MI port") 110, a selector 111, the tag memory 112, a move-in buffer (hereinafter, "MI buffer") 113, and a move-out data queue (hereinafter, "MODQ") 114 are illustrated.

The MI port 110 receives a data request from the core 101 and requests execution of a READ to the control unit 102. The selector 111 requests the control unit 102 to execute the READ or a MOVE-IN. That is, when the MI port 110 requests the execution of the READ, the selector 111 requests the control unit 102 to execute the READ. When the MI buffer 113 requests to execute the MOVE-IN, the selector 111 requests the control unit 102 to execute the MOVE-IN.

The tag memory 112 retains the address of the data stored in the data memory 106. When the READ request is input into the pipeline of the control unit 102, the tag memory 112 judges whether the data requested by the core 101 is stored in the data memory 106. That is, when the tag memory 112 retains the address of the requested data, a cache hit occurs and, when the tag memory 112 does not retain the address of the requested data, a cache miss occurs.

When the cache miss occurs, the MI buffer 113 instructs the MAC 115 to transfer the data for which the cache miss occurs, to the MIDQ 104. After the data for which the cache miss occurs is transferred to the MIDQ 104, the MI buffer 113 requests the control unit 102 to execute the MOVE-IN.

During cache replacement, the MODQ 114 temporarily retains the data that is written back from the data memory 106 through the MAC 115 to the main storing unit not depicted in FIG. 3.

In the above configuration, when the core 101 requests the data, the data request is received by the MI port 110 and the READ request is input into the control unit 102 through the selector 111. The control unit 102 inputs the READ request into the pipeline and searches the tag memory 112 to judge whether the requested data is stored in the data memory 106. As the result of the judgment, when the requested data is stored in the data memory 106 and the cache hit occurs, the data is output from the data memory 106 and is transferred to the core 101 through the selectors 107 and 108 and the data bus 109. Thereby, the pipeline process of the READ is completed.

On the other hand, when the address of the requested data is not retained by the tag memory 112 and the cache miss occurs, the address of the data for which the cache miss occurs is notified from the tag memory 112 to the MI buffer 113. The MI buffer 113 instructs the MAC 115 to transfer the data for which the cache miss occurs to the MIDQ 104. That is, when the address of the data requested by the core 101 is not stored in the tag memory 112, the MI buffer 113 instructs the MAC 115 to transfer the data requested by the core 101 to the MIDQ 104.

The MAC 115 receives the instruction from the MI buffer 113, obtains the data requested by the core 101 from the main storing unit, and transfers the obtained data to the MIDQ 104. After the data requested by the core 101 is transferred to the MIDQ 104, the MI buffer 113 inputs a request for execution of the MOVE-IN into the control unit 102 through the selector 111. In the control unit 102, the MOVE-IN request is input into the pipeline and, in response to the pipeline process of the MOVE-IN request, the data temporarily retained in the MIDQ 104 is output to the data memory 106 through the selector 105 and the data is written into the data memory 106. After the data output from the MIDQ 104 is written into the data memory 106, the same data is output from the MIDQ 104 to the selector 107 through the line L0.

In this case, the cycle for outputting the data from the MIDQ 104 to the selector 107 through the line L0 is same as the cycle for outputting the data from the data memory 106 when the READ is executed. That is, in the embodiment, the data output from the MIDQ 104 is not written into the data memory 106 simultaneously with the data output to the selector 107 through the line L0. Instead, the data is output to the selector 107 after the writing of the data comes to an end. Thereby, the cycle of the pipeline process for the data to arrive at the selector 107 becomes same for the cases where the READ is executed and where the MOVE-IN is executed. Therefore, the data transfer from the selector 107 to the core 101 can be realized by the common control.

When the data from the MIDQ 104 arrives at the selector 107 through the line L0, the data is transferred to the core 101 through the selectors 107 and 108 and the data bus 109 similarly to the case where the READ is executed. Thereby, the pipeline process for the MOVE-IN comes to an end. That is, in the embodiment, even when a cache miss occurs, the core 101 obtains the requested data simultaneously with the end of the MOVE-IN. In other words, the data written into the data memory 106 by the MOVE-IN does not need to be read by the READ and be transferred to the core 101. As a result, when the cache miss occurs, the latency in data acquisition by the core 101 can be reduced by the time period that corresponds to the time period for executing one READ.

Figure 4:
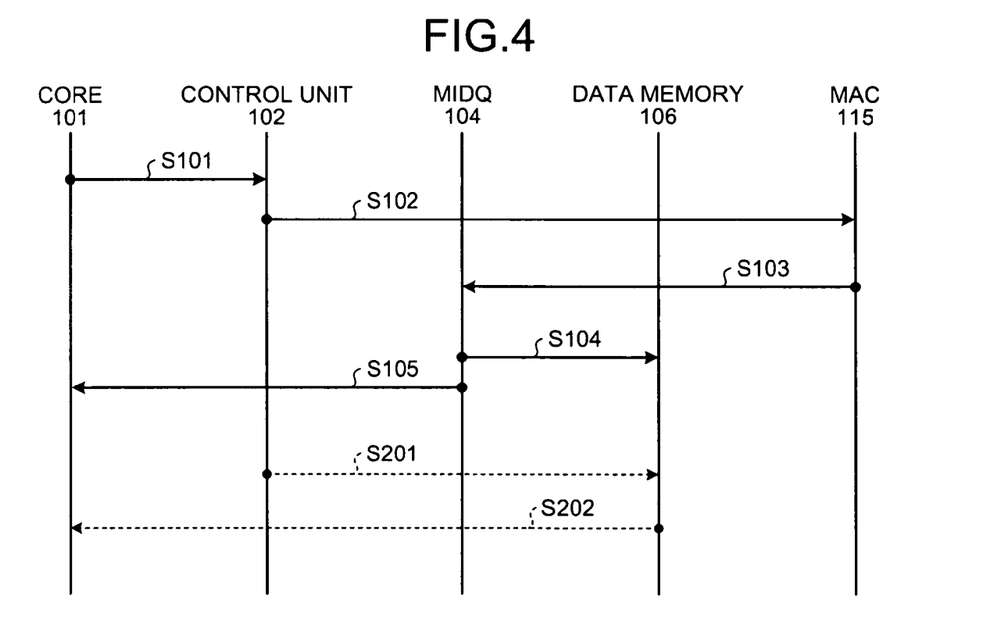
FIG. 4 is a sequence chart of operations executed according to the embodiment when a cache miss occurs.
Figure 5:
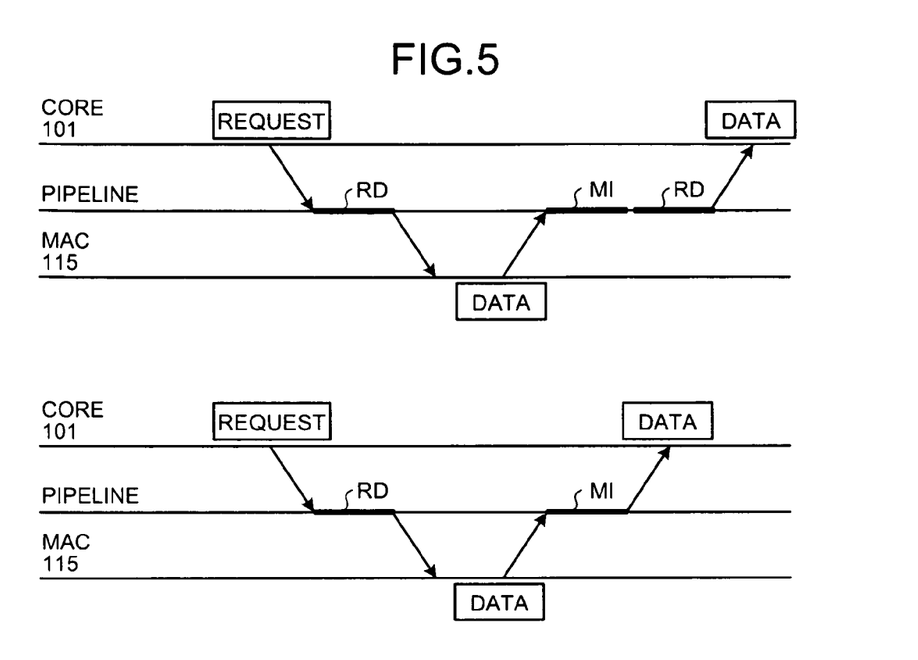
FIG. 5 is a chart for explaining how to reduce latency according to the embodiment.

The reduction of latency at the cache miss will be described referring to FIGS. 4 and 5. FIG. 4 is a sequence chart of the operations executed according to the embodiment when a cache miss occurs.

When data is needed for computing, etc., by the core 101, execution of a READ is requested from the core 101 to the control unit 102 through the MI port 110 and the selector 111 (Step S101). In the control unit 102, a READ request is input into the pipeline. When the READ request is processed, a search in the tag memory 112, etc., are executed. In the example of FIG. 4, the data that the core 101 requests for is not stored in the data memory 106 and the address of the data is not retained in the tag memory 112. That is, because the cache miss occurs, the control unit 102 instructs the MAC 115 through the MI buffer 113 to transfer the data (Step S102). The data that the core 101 requests for is obtained by the MAC 115 from the main storing unit not illustrated in FIG. 4 and the data is transferred to the MIDQ 104 (Step S103) and the MIDQ 104 temporarily retains the data.

In the control unit 102, after the READ request is input, the MOVE-IN request is input from the MI buffer 113 into the pipeline taking an interval of the predetermined cycles. Why the interval of the predetermined cycles is taken before the MOVE-IN request is input after inputting the READ request into the pipeline is to prevent the resources such as the data memory 106 and the data bus 109 from being used simultaneously by a plurality of instructions.

When a cache miss actually occurs, as above, the MI buffer 113 instructs the MAC 115 to transfer the data for which the cache miss occurs to the MIDQ 104. After the data is transferred by the MAC 115 to the MIDQ 104, a MOVE-IN request is input. Therefore, it is necessary to complete the transfer of the data to be moved by the MOVE-IN to the MIDQ 104 before the MOVE-IN request is input into the pipeline. Therefore, the interval from the input of the READ request to the input of the MOVE-IN request into the pipeline becomes longer (for example, 100 cycles or more) than the interval that is necessary to prevent the resources such as the data memory 106 and the data bus 109 from being used simultaneously by a plurality of instructions.

When the data for which the cache miss occurs is retained in the MIDQ 104 and the MOVE-IN request is input into the pipeline of the control unit 102, the data retained by the MIDQ 104 is output to the data memory 106 through the selector 105 (Step S104) and the data is written into the data memory 106. When the data is written in the data memory 106, the same data as the data is output from the MIDQ 104 to the selector 107 through the line L0, and is transferred to the core 101 through the selectors 107 and 108 and the data bus 109 (Step S105). Thereby, the core 101 is able to obtain the data requested simultaneously with the completion of the MOVE-IN. In this case, when the line L0 and the selector 107 are not disposed, the Step S105 is not executable and steps indicated by dotted lines in FIG. 4 are necessary after the completion of the MOVE-IN by the time when the core 101 obtains the data.

That is, the process at Step S105 is not executed and execution of a READ is again requested from the MI buffer 113 to the control unit 102. In the control unit 102, the READ request is input into the pipeline and, when the READ request is processed, a search in the tag memory 112, etc., are executed. In this case, due to the MOVE-IN that has completed, the data memory 106 has stored therein the data that the core 101 requests. That is, because the cache hit occurs, the data memory 106 is instructed to output the requested data (Step S201). The requested data is transferred from the data memory 106 to the core 101 (Step S202).

The processes at Steps S201 and S202 can be omitted by providing the line L0 and the selector 107 and, therefore, the latency can be reduced by the time period for executing one READ in the pipeline of the control unit 102. That is, without the line L0 and the selector 107, as illustrated in the upper portion of FIG. 5, two READs (RDs) and one MOVE-IN (MI) are executed in the pipeline by the time when the core 101 obtains the data. Whereas, with the line L0 and the selector 107 according to the embodiment, as illustrated in the lower portion of FIG. 5, the core 101 is able to obtain the requested data by execution of only one READ (RD) and one MOVE-IN (MI).

Therefore, in the embodiment, the latency can be reduced by the time period for executing one READ and, because the number of READs input into the pipeline is reduced, as a result, the number of times of using the pipeline can be reduced.

Figure 6:
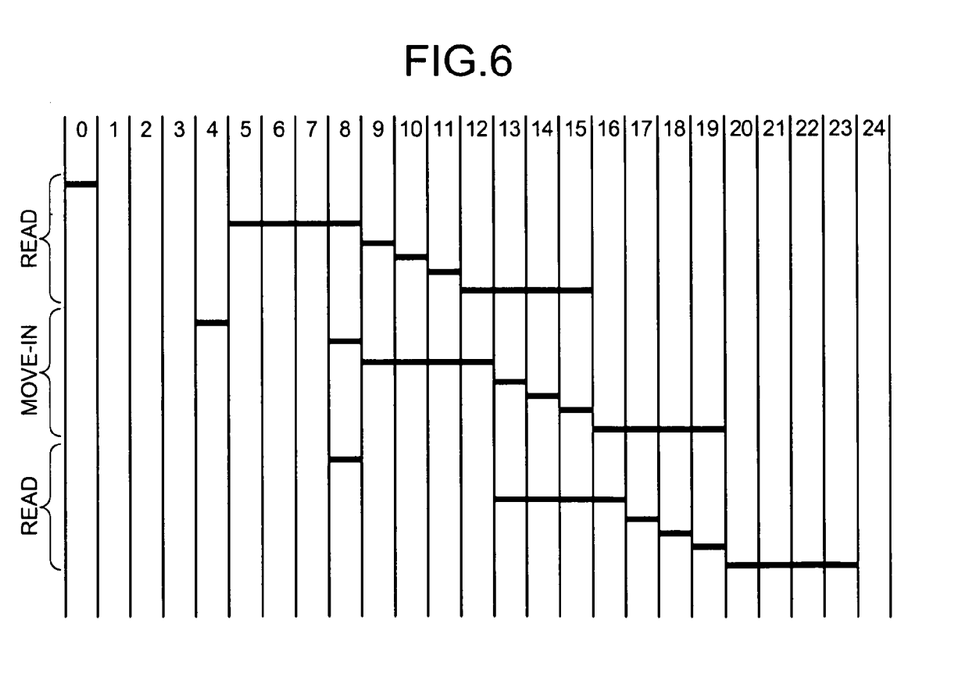
FIG. 6 is a chart of an example of a pipeline process according to the embodiment.

A specific example of the pipeline process in the control unit 102 will be described referring to FIG. 6. FIG. 6 is a chart of an example of the pipeline process executed when instructions are input into the pipeline of the control unit 102 in order of a READ request, a MOVE-IN request, and a READ request. In FIG. 6, each of the numbers on the upper edge represents the cycle number. Thick lines each traversing a cycle represent that a process that uses the resources such as the data memory 106 and the data bus 109 is executed in each cycle. However, the cycle numbers depicted in FIG. 6 are used for convenience of the description and, therefore, the cycle numbers used in an actual pipeline process may be different from those in FIG. 6. Hereinafter, it is assumed that four cycles are necessary to access the data memory 106 for each of data writing and data reading. It is also assumed that four cycles are also necessary to transfer data to the core 101 by the data bus 109.

When a READ request is input into the pipeline of the control unit 102 in a 0th cycle, inputting of any instruction into the pipeline is prohibited for four cycles from the 0th cycle to the 3rd cycle such that the input READ request and the next instruction do not interfere with each other for the resources such as the data memory 106 and the data bus 109. That is, as above, four cycles are necessary to read data from the data memory 106 during the execution of a READ and, therefore, the data memory 106 is occupied for four cycles due to the execution of the READ. Similarly, the data bus 109 is occupied for four cycles due to the transfer of the data associated with the execution of the READ. Therefore, the start of execution of a new instruction by the pipeline is caused to stand by for four cycles from the 0th cycle to the 3rd cycle such that no interference occurs with the new instruction.

When the READ request is input in the 0th cycle: a search of an address in the tag memory 112, etc., are executed from the first cycle to the fourth cycle; and data reading from the data memory 106 is executed for four cycles from the fifth cycle to the eighth cycle. In the ninth cycle, the data is output from the data memory 106 to the selector 107. Thereafter: the data is transferred from the selector 107 to the selector 108 from the tenth cycle to the 11th cycle; and the data bus 109 transfers the data to the core 101 in four cycles from the 12th cycle to the 15th cycle. Thereby, the first READ completes.

Inputting of any instruction into the pipeline is prohibited from the 0th cycle to the third cycle because of the input of the READ request in the 0th cycle. However, when the fourth cycle starts, a new MOVE-IN request is input into the pipeline. In this case, similarly to the case of the input of the READ request, inputting of any instruction into the pipeline is prohibited for four cycles. That is, as above, four cycles are necessary to write the data into the data memory 106 during the execution of the MOVE-IN. Therefore, the data memory 106 is occupied for four cycles due to the execution of the MOVE-IN. Similarly, the data bus 109 is occupied for four cycles due to the transfer of the data associated with the execution of the MOVE-IN. Therefore, the start of execution of a new instruction by the pipeline is caused to stand by for four cycles from the fourth cycle to the seventh cycle such that no interference occurs with the new instruction.

When a MOVE-IN request is input in the fourth cycle: a new registration of an address in the tag memory 112, etc., are executed from the fifth cycle to the seventh cycle; and the data retained in the MIDQ 104 is output to the data memory 106 through the selector 105 in the eighth cycle. Writing of the data is executed into the data memory 106 during the four cycles from the ninth cycle to the 12th cycle. In the 13th cycle, the same data as the data that is written in the data memory 106 is output from the MIDQ 104 to the selector 107 through the line L0. Thereafter, the data is transferred from the selector 107 to the selector 108 from the 14th cycle to the 15th cycle. The data bus 109 transfers the data to the core 101 in four cycles from the 16th cycle to the 19th cycle. Thereby, the MOVE-IN completes.

It should be noted in the above that, in both of the execution of the first READ and the execution of the MOVE-IN, the data is output to the selector 107 in the ninth cycle from the input of each of the instructions. That is, when the READ is executed, the READ request is input in the 0th cycle and the data is output to the selector 107 in the ninth cycle. On the other hand, when the MOVE-IN is executed, the MOVE-IN request is input in the fourth cycle and the data is output to the selector 107 in the 13th cycle. Therefore, as to the data transfer from the selector 107 to the core 101, only a common control may be executed for both of the execution of the READ and the execution of the MOVE-IN.

In this manner, by providing the line L0 that connects the input portion and the output portion of the data memory 106, the data output from the MIDQ 104 can be handled similarly to the data output from the data memory 106. That is, the timing at which the data is transferred from the input portion of the data memory 106 to the output portion through the line L0 can be made coincided with the timing at which the data is actually output from the data memory 106 when the READ is executed. As a result, the control concerning the data transfer from the selector 107 to the core 101 executed when the READ is executed and that executed when the MOVE-IN is executed can be made common.

Inputting of any instruction into the pipeline is prohibited from the fourth cycle to the seventh cycle due to the input of the MOVE-IN request in the fourth cycle. However, in the eighth cycle, a new READ request is input into the pipeline. Thereafter, similarly to the first READ, the data is read from the data memory 106 from the 13th cycle to the 16th cycle, and the data read from the data memory 106 is output to the selector 107 in a 17th cycle which is the ninth cycle from the input of the READ request. The data bus 109 transfers the data to the core 101 from the 20th cycle to the 23rd cycle. Thereby, the second READ completes.

The above two READs and the one MOVE-IN are input into the pipeline with intervals each of four cycles taken between each other. Therefore, as depicted in FIG. 6, the data memory 106 and the data bus 109 are continuously used by the three instructions without discontinuation. That is, the data memory 106: is accessed by the first READ from the fifth cycle to the eighth cycle; is accessed by the MOVE-IN from the ninth cycle to the 12th cycle; and is accessed by the second READ from the 13th cycle to the 16th cycle. The data bus 109: transfers the data by the first READ from the 12th cycle to the 15th cycle; transfers the data by the MOVE-IN from the 16th cycle to the 19th cycle; and transfers the data by the second READ from the 20th cycle to the 23rd cycle.

In this manner, in the embodiment, no interference occurs among the instructions for the resources such as the data memory 106 and the data bus 109, and the resources are continuously used without discontinuation. Therefore, more efficient use of resources can be realized. In the example depicted in FIG. 6, it is assumed that each of the READ and the MOVE-IN occupies the data memory 106 and the data bus 109 for four cycles. However, the number of cycles to be occupied is not limited to four. The number of cycles of the occupation of the data memory 106 and that of the data bus 109 may not be equal. In these cases, the largest number of cycles during which the resources are occupied may be set as a term during which an input of instruction is prohibited such that no interference occurs between two consecutive instructions concerning the use of the resources.

As above, according to the embodiment, the input portion and the output portion of the data memory that constitutes a part of the cache memory are connected and, when the MOVE-IN is executed, the same data as the data to be input from the input portion to the data memory is also transferred to the output portion of the data memory. Therefore, the data written in the data memory by the MOVE-IN can be handled similarly to the data read from the data memory when the READ is executed. That is, the data written in the data memory by the MOVE-IN does not need to be read again by the READ and the execution of this READ can be omitted. As a result, the latency incurred in data acquisition by the core when a cache miss occurs can be reduced without increase in the circuit scale.

According to the embodiments of the cache memory control apparatus, the semiconductor integrated circuit, and the cache memory control method described herein, a latency for a core to obtain data can be reduced when a cache miss occurs without increasing the circuit scale.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for controlling a data memory that stores therein data transferred from a memory access controller connected to a main storing unit, the apparatus comprising:
   a processing unit that executes a computing process using data;
   a queue that temporarily retains data that is transferred from the memory access controller to the data memory;
   a selector that selects either one of data output from the queue and data output from the data memory;

a line that connects a point between the queue and the data memory, and the selector; and a control unit that, when data retained in the queue is written in the data memory, outputs same data as the data that is written in the data memory from the queue to the selector through the line, and transfers the output data from the selector to the processing unit.

2. The apparatus according to claim 1, wherein the selector selects the data output through the line when data requested by the processing unit is not stored in the data memory and the requested data is transferred from the memory access controller to the data memory.

3. The apparatus according to claim 1, wherein the control unit comprises
   a pipeline processing unit that pipeline-processes an instruction concerning transferring of data, wherein
   in the pipeline processing of the pipeline processing unit, a cycle during which data is actually output from the data memory and a cycle during which data is transferred to the processing unit through the line are made coincident.

4. The apparatus according to claim 3, wherein the pipeline processing unit, after execution of one instruction is started, delays the start of execution of a next instruction for a number of cycles during which accesses to the data memory continues.

5. The apparatus according to claim 3, wherein the pipeline processing unit, after execution of one instruction is started, delays the start of execution of a next instruction for a number of cycles required for data transfer by the control unit.

6. A semiconductor integrated circuit comprising:
   a processor core that executes a computing process using data;
   a data memory that has stored therein data transferred from a memory access controller connected to a main storing unit;
   a queue that temporarily retains data that is transferred from the memory access controller to the data memory;
   a selector that selects either one of data output from the queue and data output from the data memory;
   a line that connects a point between the queue and the data memory, and the selector; and
   a control unit that, when data retained in the queue is written in the data memory, outputs same data as the data that is written in the data memory from the queue to the selector through the line, and transfers the output data from the selector to the processor core.

7. The semiconductor integrated circuit according to claim 6, comprising the plurality of processor cores, wherein the data memory is divided corresponding to a plurality of banks of the main storing unit that each have stored therein data having an address different from each other.

8. A method for controlling a data memory that stores therein data transferred from a memory access controller connected to a main storing unit in a data memory control apparatus comprising a processing unit that executes computing processing using data, the method comprising:
   temporarily retaining data that is transferred from the memory access controller to the data memory in a queue;
   writing data retained in the queue to the data memory;
   outputting same data as the data that is written in the data memory from the queue to a selector that selects either one of data output from the queue and data output from the data memory, through a line that connects a point between the queue and the data memory, and the selector; and
   transferring the output data from the selector to the processing unit.

\* \* \* \* \*